(12) United States Patent
Hong et al.

(10) Patent No.: US 7,901,651 B2
(45) Date of Patent: Mar. 8, 2011

(54) METHOD OF PREPARING ZINC SILICATE-BASED PHOSPHOR AND ZINC SILICATE-BASED PHOSPHOR PREPARED USING THE METHOD

(75) Inventors: Kugsun Hong, Seoul (KR); Soonjae Kwon, Yongin-si (KR); Hyunsik Kim, Yongin-si (KR); Sooyeon Seo, Yongin-si (KR); Junhong Noh, Seoul (KR); Heesuk Roh, Seoul (KR); Jaesul An, Seoul (KR)

(73) Assignees: Samsung SDI Co., Ltd., Giheung-gu, Yongin-si, Gyeonggi-do (KR); Seoul National University Industry Foundation, Gwanak-gu, Seoul (KR)

( * ) Notice: Subject to any disclaimer, the term of this patent is extended or adjusted under 35 U.S.C. 154(b) by 181 days.

(21) Appl. No.: 12/289,279

(22) Filed: Oct. 23, 2008

(65) Prior Publication Data

US 2009/0285742 A1 Nov. 19, 2009

(30) Foreign Application Priority Data

May 15, 2008 (KR) .................. 10-2008-0045062

(51) Int. Cl.
*C01B 33/00* (2006.01)

(52) U.S. Cl. ........................................ 423/324; 423/326
(58) Field of Classification Search ................. 423/324, 423/325, 326
See application file for complete search history.

(56) References Cited

U.S. PATENT DOCUMENTS 7,241,400 B2 * 7/2007 Furusawa et al. ....... 252/301.6 F
2009/0029852 A1 * 1/2009 Hagemeyer ................. 502/312

FOREIGN PATENT DOCUMENTS

JP 1-272689 * 10/1989

* cited by examiner

*Primary Examiner* — Edward M Johnson
(74) *Attorney, Agent, or Firm* — Robert E. Bushnell, Esq.

(57) ABSTRACT

Provided are a method of preparing a zinc silicate-based phosphor and a zinc silicate-based phosphor prepared using the method. The method includes: (a) preparing a solution including a Zn precursor compound and a Si precursor compound; (b) adding a coprecipitant to the solution to form precipitation; and (c) heat treating the solution in which the precipitation is formed to synthesize zinc silicate ($Zn_2SiO_4$), wherein a solvent of the solution including the Zn precursor compound and the Si precursor compound includes at least one selected from the group consisting of ethanol, methanol, 1-propanol, 2-propanol, 1-butanol, 2-butanol, 1-pentanol, 2-pentanol, 3-pentanol, 1-hexanol, and 1-heptanol, and hydrazine is used as the coprecipitant.

10 Claims, 8 Drawing Sheets

METHOD OF PREPARING ZINC SILICATE-BASED PHOSPHOR AND ZINC SILICATE-BASED PHOSPHOR PREPARED USING THE METHOD

CLAIM OF PRIORITY

This application makes reference to, incorporates the same herein, and claims all benefits accruing under 35 U.S.C. §119 from an application earlier filed in the Korean Intellectual Property Office on 15 May 2008 and there duly assigned Serial No. 10-2008-0045062.

BACKGROUND OF THE INVENTION

1. Field of the Invention

The present invention relates to a method of preparing a zinc silicate-based phosphor and a zinc silicate-based phosphor prepared using the method, and more particularly, to a method of preparing a zinc silicate-based phosphor, by which uniform size distribution of nano-sized particles can be obtained, and which can be performed at a low temperature and is cost-effective, and a zinc silicate-based phosphor prepared using the method.

2. Description of the Related Art

A phosphor is a material which emits light in response to energy stimulation. In general, phosphors are used in light sources such as Hg fluorescent lamps, Hg-free fluorescent lamps, etc., various devices such as electron emission devices, plasma display panels (PDPs), etc., and various additional uses are expected with development of new multimedia devices.

Nano phosphors, also referred to as nano-sized phosphors, advantageously exhibit a lower light scattering effect, compared to conventional bulk-sized phosphors.

Nano phosphors should have properties of small particle size, separation between particles, and good light emission efficiency. However, when producing small and well-separated phosphors, light emission efficiency thereof is generally very low, and when a sintering temperature or time is increased in order to increase the light emission efficiency, phosphor particles are agglomerated, and thus the phosphor particles are not nano-sized any more, which is a technical drawback in the field of conventional nano phosphor production. Another disadvantage with the conventional technology is a prolonged period of processing, including mixing, drying, firing, and pulverizing. In order to overcome such drawbacks, heat spraying and laser crystallization methods have been suggested as alternative methods of increasing light emission efficiency. Despite having high quality characteristics, uses of such methods are severely limited due to high operating and equipment costs, and difficulty in scale-up manufacturing.

In addition, there is a solid-state reaction method that can be used to mass produce zinc silicate ($Zn_2SiO_4$:Mn) phosphors.

SUMMARY OF THE INVENTION

The present invention provides a method of preparing a zinc silicate-based phosphor, by which uniform size distribution of nano-sized particles can be obtained, and which is cost-effective.

The present invention also provides a zinc silicate-based phosphor prepared using the method.

According to an aspect of the present invention, there is provided a method of preparing a zinc silicate-based phosphor, the method comprising: (a) preparing a solution comprising a Zn precursor compound and a Si precursor compound; (b) adding a coprecipitant to the solution to form precipitation; and (c) heat-treating the solution in which the precipitation is formed to synthesize zinc silicate ($Zn_2SiO_4$). A solvent of the solution including the Zn precursor compound and the Si precursor compound comprises one selected from the group consisting of ethanol, methanol, 1-propanol, 2-propanol, 1-butanol, 2-butanol, 1-pentanol, 2-pentanol, 3-pentanol, 1-hexanol, and 1-heptanol. The coprecipitant includes hydrazine.

Preferably, the method of preparing the zinc silicate-based phosphor may further comprise (d) heat-treating the synthesized zinc silicate.

More preferably, two-step heat treatment processes may be performed. More specifically, the method of preparing the zinc silicate-based phosphor may further comprise performing a heat treatment of the synthesized zinc silicate in an environment having an ambient temperature of 600° C. to 1100° C. in an air atmosphere before the steps of heat-treating the synthesized zinc silicate.

According to another aspect of the present invention, there is provided a zinc silicate-based phosphor suitable for use in a high-resolution, high-efficiency device or for use as powder for inkjet printing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described in more detail.

The present invention provides a method of preparing a zinc silicate-based phosphor, the method including: (a) preparing a solution including a Zn precursor compound and a Si precursor compound; (b) adding a coprecipitant to the solution to form precipitation; and (c) heat-treating the solution in which the precipitation is formed to synthesize zinc silicate ($Zn_2SiO_4$).

A solvent of the solution including the Zn precursor compound and the Si precursor compound may include at least one selected from the group consisting of ethanol, methanol, 1-propanol, 2-propanol, 1-butanol, 2-butanol, 1-pentanol, 2-pentanol, 3-pentanol, 1-hexanol, and 1-heptanol. These solvents have a boiling point of approximately 180° C. or less, and thus the heat treatment process of operation (c) should be performed at a temperature greater than the boiling point of the solvents. Therefore, the method of preparing the zinc silicate-based phosphor, according to the present invention, can have an advantage as a low-temperature solvothermal synthesis method.

The coprecipitant may be hydrazine ($H_2N_2$—$H_2O$) alone, or may further include at least one selected from the group consisting of urea, potassium hydroxide, calcium hydroxide, and ammonium hydroxide, in addition to hydrazine.

The method of preparing the zinc silicate-based phosphor, according to the present invention, has an advantage in that zinc silicate is directly synthesized without synthesizing a hemimorphite phase ($Zn_4Si_2O_7(OH)_2 \cdot H_2O$). When a zinc silicate-based phosphor is prepared using a general hydrothermal method, the hemimorphite phase ($Zn_4Si_2O_7(OH)_2 \cdot H_2O$) can be produced as an intermediate product. To synthesize pure zinc silicate by removing the hemimorphite phase, a high-temperature synthesis process or additional heat treatment process is further needed. That is, according to the method of preparing the zinc silicate-based phosphor, according to the present invention, pure zinc silicate-based phosphor can be synthesized without performing such a high-temperature synthesis process or additional heat treatment process.

In addition, according to the method of preparing the zinc silicate-based phosphor, according to the present invention, the silicate-based phosphor that has nano-sized particles having a uniform size distribution and a spherical shape, with a particle diameter of tens of nanometers, can be obtained. It is considered that the method of the present invention addresses the disadvantages of the zinc silicate-based phosphor synthesized using the general hydrothermal synthesis method in that the synthesized powder has a particle diameter of several hundreds of nanometers to several microns, and is made of pillar-shaped particles, not spherical-shaped particles. A zinc silicate-based phosphor prepared using the method of preparing the zinc silicate-based phosphor, according to the present invention, can exhibit very high light emission efficiency.

In addition, the zinc silicate-based phosphor prepared using the method of preparing the zinc silicate-based phosphor, according to the present invention, has small particle size and uniform particle size distribution, thus being suitable for use in a high-resolution, high-efficiency device requiring nano-sized powder with a particle diameter of tens of nanometers or for use as powder for inkjet printing.

Hereinafter, each operation of the method of preparing the zinc silicate-based phosphor according to the present invention will be described in greater detail.

In operation (b), which is a process of adding a coprecipitant to the solution to form precipitation, preferably, the volume of the coprecipitant added may be 0.1 to 20 times the volume of the solution including the Zn precursor compound and the Si precursor compound. When the volume of the coprecipitant is less than 0.1 times the volume of the solution including the Zn precursor compound and the Si precursor compound, precipitation does not occur or an amount of precipitation is insignificant, and thus zinc silicate may not be synthesized. When the volume of the coprecipitant is greater than 20 times the volume of the solution including the Zn precursor compound and the Si precursor compound, instead of synthesizing zinc silicate particles with a spherical shape, zinc silicate particles with a long pillar-like shape are synthesized.

While the heat treatment process of operation (c) is performed, zinc silicate is synthesized, and the synthesized zinc silicate is heat treated to improve crystallinity.

Thus, the method of preparing the zinc silicate-based phosphor, according to the present invention, may further include operation (d) for heat-treating the synthesized zinc silicate.

The heat treatment process of operation (c) may be preferably performed in an environment having an ambient temperature of 100 to 300° C.

In addition, the heat treatment process of operation (d) may be preferably performed in an environment having an ambient temperature of 600 to 1100° C.

Preferably, the heat treatment process of operation (d) may be performed in an air, nitrogen, or hydrogen atmosphere, or in a nitrogen atmosphere mixed with 10% or less of hydrogen.

In addition, the method of preparing the zinc silicate-based phosphor, according to the present invention, may further include operation (e) for heat-treating the heat-treated zinc silicate in an environment having an ambient temperature of 600 to 1100° C. That is, the method of preparing the zinc silicate-based phosphor, according to the present invention, may include two heat treatment processes performed on zinc silicate, thereby further improving the crystallinity of the zinc silicate-based phosphor.

For example, the zinc silicate powder obtained in operation (c) may be heat-treated in an environment having an ambient temperature of 600 to 1100° C. in an air atmosphere, and then heat-treated in an environment having an ambient temperature of 600 to 1100° C. in a reducing atmosphere.

In operation (a), which is a process for preparing a solution including a Zn precursor compound and a Si precursor compound, the solution including the Zn precursor compound and the Si precursor compound is prepared to include Zn and Si at a molar ratio of 1.5:1 to 2.5:1. When the molar ratio of Zn to Si is less than 1.5:1, a second phase of $ZnSiO_3$ occurs or a large amount of unreacted $SiO_2$ may remain. On the other hand, when the molar ratio of Zn to Si is greater than 2.5:1, a large amount of unreacted ZnO may remain.

In addition, a $(Zn_xMn_{1-x})_2SiO_4$ phosphor, in which a part of Zn in $Zn_2SiO_4$ prepared using the method of preparing the zinc silicate-based phosphor according to the present invention is substituted with Mn, may be prepared using the method of preparing the zinc silicate-based phosphor according to the present invention.

The $(Zn_xMn_{1-x})_2SiO_4$ phosphor may be synthesized such that the solution including the Zn precursor compound and the Si precursor compound of operation (a) further includes an Mn precursor compound, and then the remaining steps of the method of the present invention are performed.

In the solution including the Zn precursor compound, the Mn precursor compound, and the Si precursor compound, a molar ratio of Mn to Zn may be in a range of 0.01:1 to 0.2:1. When the molar ratio of Mn to Zn is less than 0.01:1, a small amount of Mn causes low light emission efficiency. When the molar ratio of Mn to Zn is greater than 0.2:1, light emission efficiency is decreased due to a concentration quenching effect, a single phase of $Zn_2SiO_4$ is not synthesized, and a second phase related to Mn is formed.

In addition, preferably, a molar ratio of the combined total of Mn and Zn to Si may be in a range of 1.5:1 to 2.5:1. When the molar ratio of the combined total of Zn and Mn to Si is less than 1.5:1, a second phase of $ZnSiO_3$ is formed or a large amount of unreacted $SiO_2$ may remain. When the molar ratio of the combined total of Zn and Mn to Si is greater than 2.5:1, a large amount of unreacted ZnO may remain.

The Zn precursor compound may be an oxide, hydroxide or nitrate of Zn, the Mn precursor compound may be an oxide, hydroxide or nitrate of Mn, and the Si precursor compound may be an oxide or hydroxide of Si, TEOS (Tetraethyl orthosilicate/$Si(OC_2H_5)_4$), TMOS (Tetramethyl orthosilicate/$Si(OCH_3)_4$) or sodium metasilicate ($Na_2SiO_3$).

The heat treatment process of operation (c) may be performed under autogenous pressure or at a pressure of 300 MPa or less.

Hereinafter, a method of preparing a zinc silicate-based phosphor, according to an embodiment of the present invention, will be described in detail.

First, Mn-nitrate and Zn-nitrate are added to ethanol as a raw material while being stirred, and completely dissolved therein. Then, $SiO_2$ particles are dispersed in the mixture, or the mixture is mixed with a solution in which $SiO_2$ is dispersed. Thereafter, hydrazine ($H_2N_2.H_2O$) and other available coprecipitants, for example, at least one selected from the group consisting of urea, potassium hydroxide, calcium hydroxide, and ammonium hydroxide, are added to the fully stirred resulting mixture to form precipitation. The precipitated mixture of operation (b) is then synthesized using a solvothermal method at a temperature of 100 to 300° C. to synthesize zinc silicate ($Zn_2SiO_4$) powder. The synthesized zinc silicate power is heat-treated at a temperature of 600 to 1100° C.

The present invention also provides a zinc silicate-based phosphor prepared using the method of preparing the zinc silicate-based phosphor, according to the present invention. The zinc silicate-based phosphor is suitable for use in high-resolution, high-efficiency devices or for use as powder for inkjet printing.

The present invention will now be described in more detail with reference to the examples below. However these examples are for illustrative purposes only and are not intended to limit the scope of the invention.

Comparative Example

Zn-nitrate, Mn-nitrate, and $SiO_2$ were measured to obtain a total weight of 12 g at a molar ratio of 1.96:0.04:1, and then added to 150 cc of ethanol. Then the mixture was fully stirred. Ammonium hydroxide was added to the resulting mixture as a coprecipitant to form precipitation having a pH of 9. The resultant was then put into a pressure reaction container coated with Teflon, and solvothermally synthesized at 180° C. and under autogenous pressure for 48 hours to obtain zinc silicate ($Zn_2SiO_4$) powder.

Example

Zinc silicate powder was obtained in the same manner as in Comparative Example, except that 5 cc of hydrazine was added to the resulting mixture before the addition of the coprecipitant.

Figure 1:
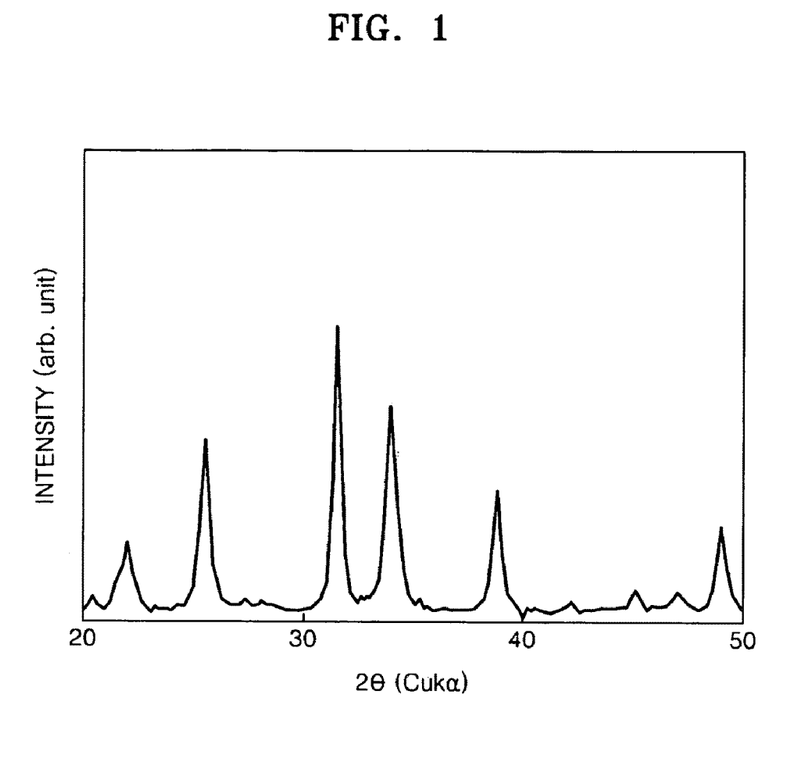
FIG. 1 is a graph showing X-ray diffraction results of zinc silicate powder synthesized using a solvothermal method, according to an embodiment of the present invention.
Figure 2:
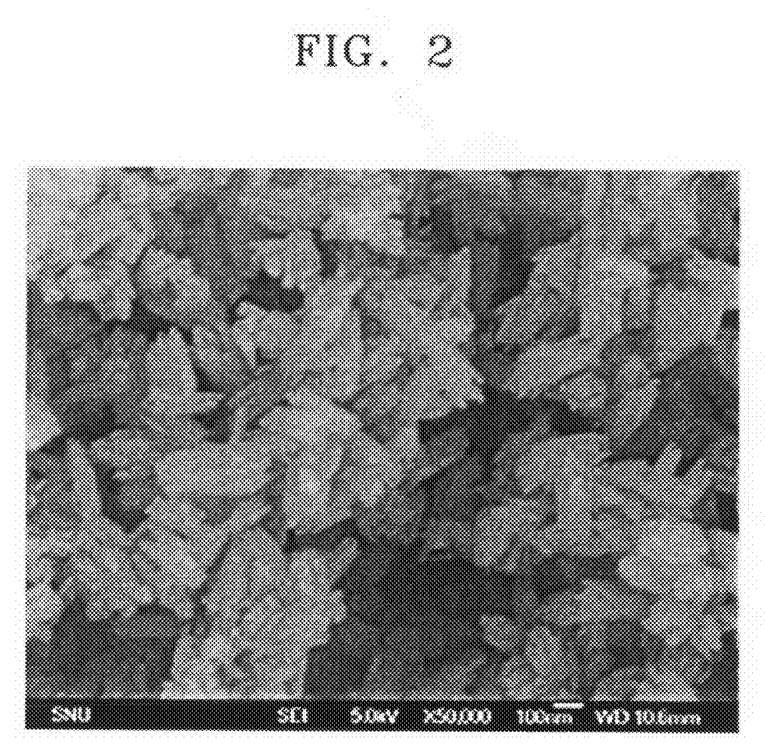
FIG. 2 is a scanning electron microscopy image of zinc silicate powder synthesized using a solvothermal method, according to an embodiment of the present invention.

FIG. 1 is a graph showing X-ray diffraction results of the synthesized zinc silicate powder of Comparative Example. It can be observed from FIG. 1 that the phase of the powder is a pure $Zn_2SiO_4$ phase. FIG. 2 is a scanning electron microscopy image of the zinc silicate powder of Comparative Example. It can be observed from FIG. 2 that most particles of the synthesized zinc silicate powder of Comparative Example have a pillar shape.

Figure 3:
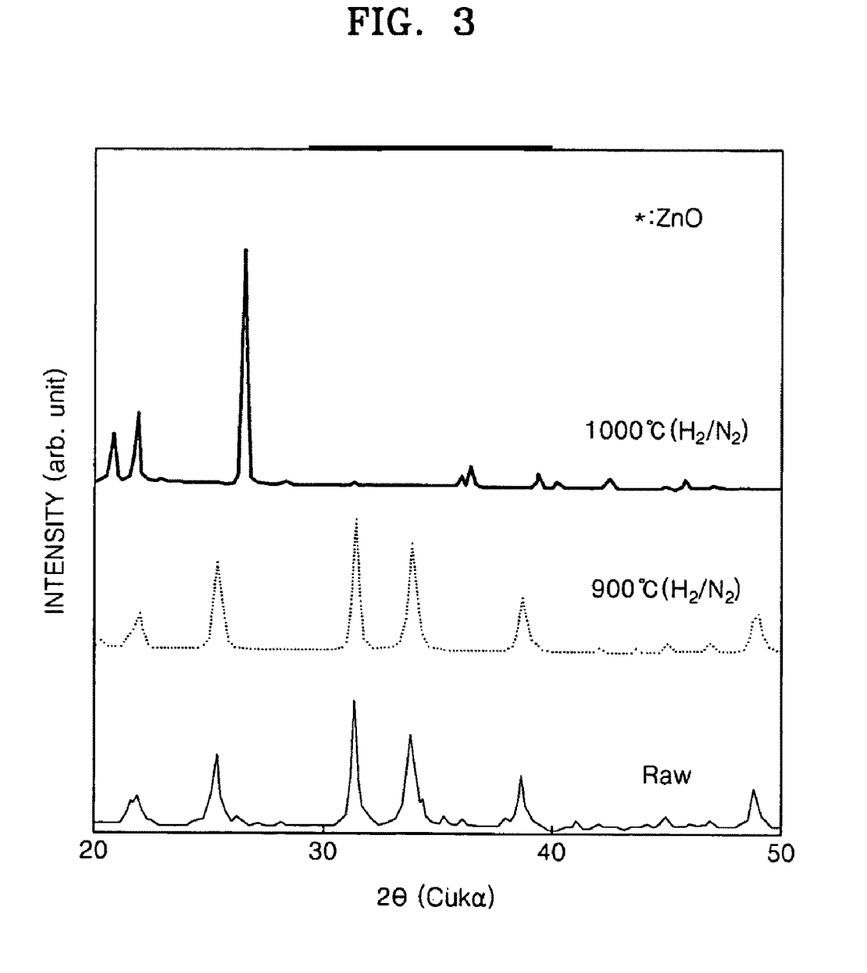
FIG. 3 is a graph showing X-ray diffraction results of zinc silicate power synthesized using a method according to an embodiment of the present invention.
Figure 5:
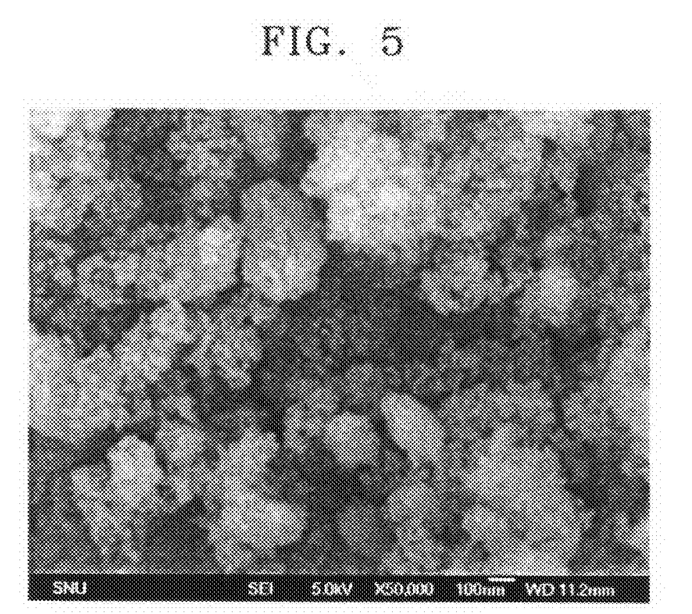
FIG. 5 is a scanning electron microscopy image of zinc silicate powder synthesized using a method according to another embodiment of the present invention.

FIGS. 3 and 5 are respectively an X-ray diffraction graph and scanning electron microscopy image of the synthesized zinc silicate powder of Example. Referring to FIGS. 3 and 5, it can be observed that the synthesized powder of Example includes a small amount of zinc oxide as a second phase, and the particles of the synthesized zinc silicate powder have a spherical shape.

FIG. 3 is a graph showing X-ray diffraction results of the synthesized zinc silicate powder of Example before a heat treatment process and the powder of Example after a heat treatment process was performed at 900° C. and 1000° C. for 2 hours each in a reducing atmosphere of 5% of $H_2$ and 95% of $N_2$. In FIG. 3, the term of "Raw" refers to the powder before the heat treatment process. In addition, '*' indicates that zinc oxide as a second phase exists. From the X-ray diffraction results, it can be seen that by performing the heat treatment process at 900° C. and 1000° C. in the reducing atmosphere, only a single phase of $Zn_2SiO_4$ exists.

Figure 4:
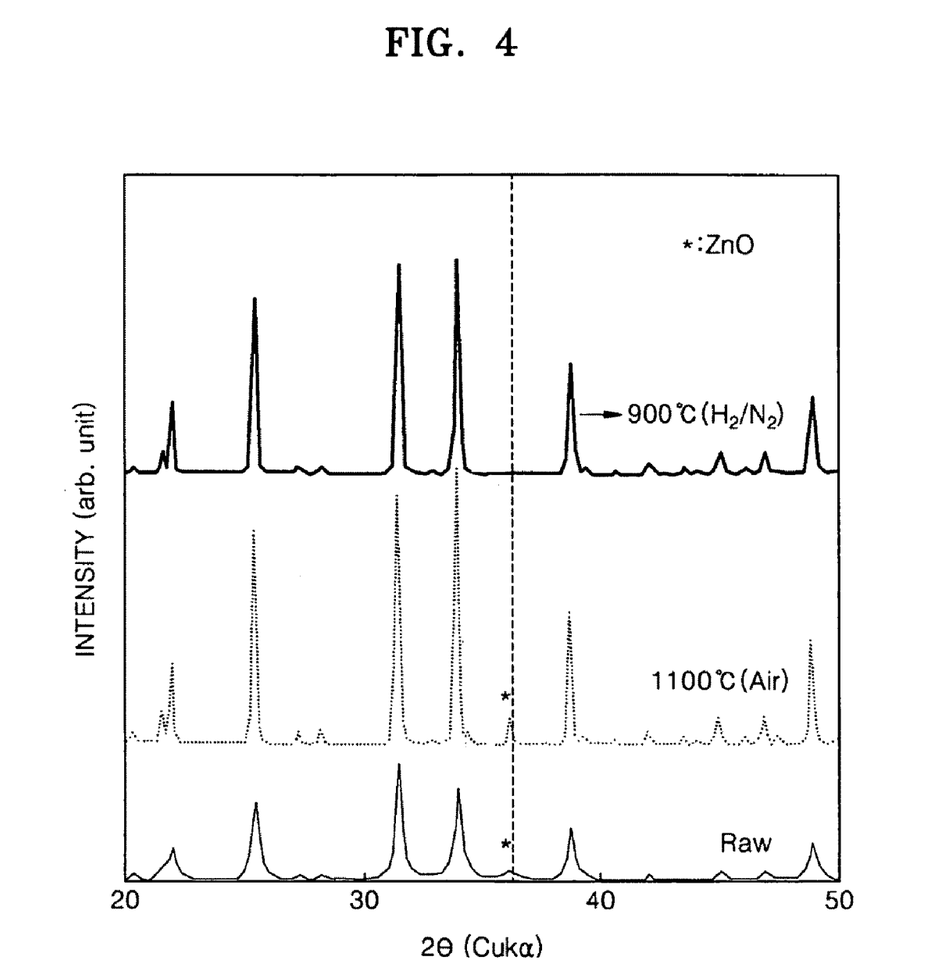
FIG. 4 is a graph showing X-ray diffraction results of zinc silicate power synthesized using a method according to another embodiment of the present invention.

FIG. 4 is a graph showing X-ray diffraction results of the synthesized zinc silicate powder of Example (raw state before a heat treatment process) and $Zn_2SiO_4$ obtained by heat treating the powder of Example at 100° C. in an air atmosphere, and then performing a heat treatment process again at 900° C. in a reducing atmosphere of 5% of $H_2$ and 95% of $N_2$. Referring to FIG. 4, after the first heat treatment process in an air atmosphere, the intensity of peaks becomes stronger, indicating an improvement in crystallinity. In addition, after the second heat treatment process in a reducing atmosphere, the peak indicated by '*' (along a vertical dotted line) disappears, and thus it can be confirmed that a second phase of zinc oxide is removed. That is, through two consecutive heat treatment processes, a single phase of $Zn_2SiO_4$ with excellent crystallinity was obtained.

Figure 6:
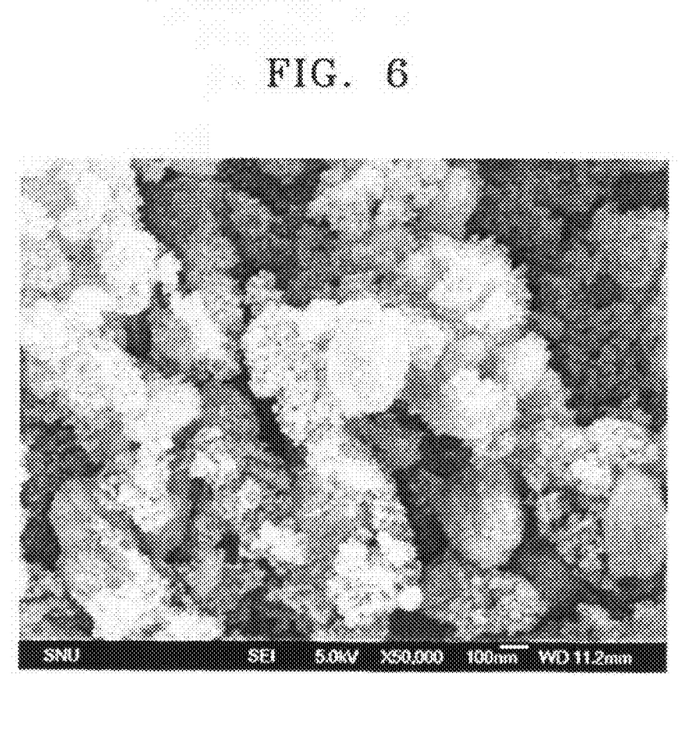
FIG. 6 is a scanning electron microscopy image of zinc silicate powder synthesized using a method according to another embodiment of the present invention.

FIG. 6 is a scanning electron microscopy image of the zinc silicate powder synthesized by heat-treating the zinc silicate power of Example at 900° C. in the forming gas atmosphere as described above. As a result, a second phase of zinc oxide was completely removed, and zinc silicate particles with a spherical shape remained without growth of the particles.

Figure 7:
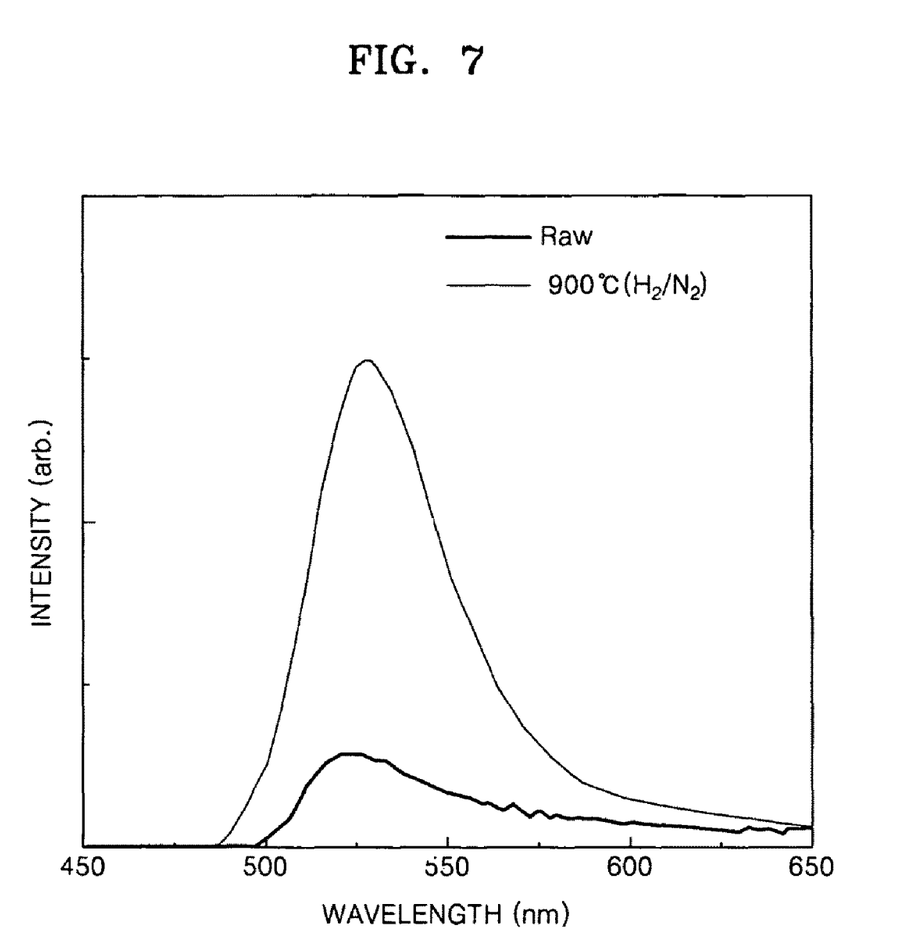
FIG. 7 is a photoluminescence (PL) graph of zinc silicate powder synthesized using a method according to another embodiment of the present invention.

In addition, to evaluate light emission properties of the powder synthesized by heat-treating the zinc silicate power of Example at 900° C. in the forming gas atmosphere as described above, photoluminescence (PL) analysis was performed, and the results are illustrated in FIG. 7. From observing the graph in FIG. 7, it can be seen that after the heat treatment process in the forming gas atmosphere, the light emission intensity was increased.

Figure 8:
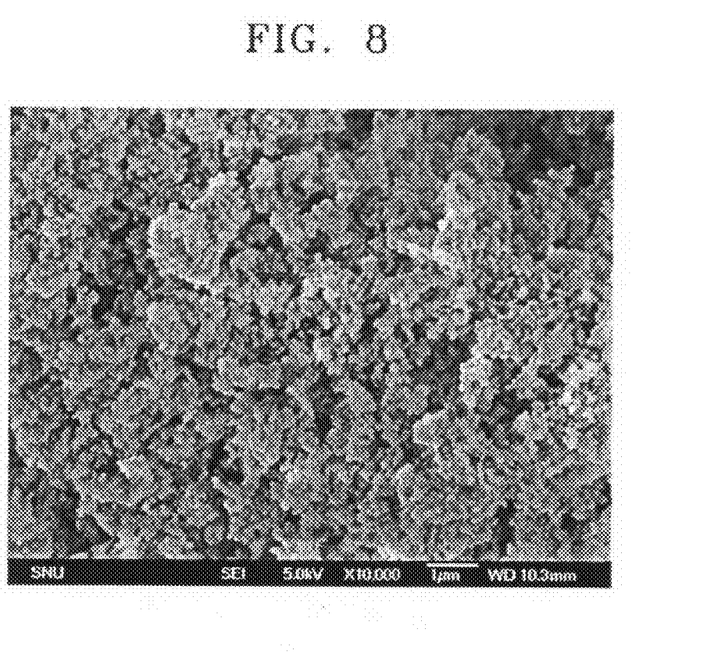
FIG. 8 is a scanning electron microscopy image of zinc silicate powder synthesized using a solvothermal method, according to an embodiment of the present invention.

FIG. 8 is a scanning electron microscopy image of the phosphor obtained by heat treating the zinc silicate powder of Comparative Example at 1100° C. in an air atmosphere, and then performing heat treatment again at 900° C. for 2 hours in the reducing atmosphere (5% of $H_2$ and 95% of $N_2$). Referring to FIG. 8, it can be seen that agglomeration severely occurs.

Figure 9:
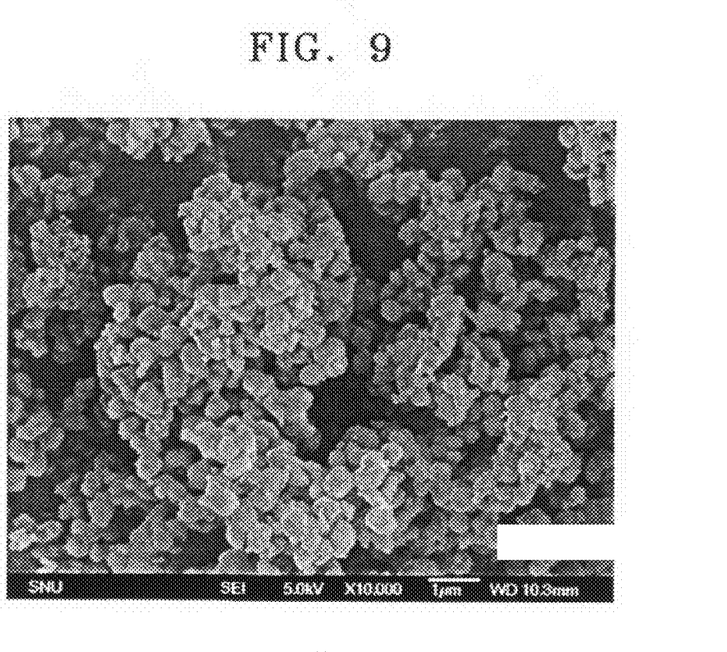
FIG. 9 is a scanning electron microscopy image of zinc silicate powder synthesized using a method according to another embodiment of the present invention.

FIG. 9 is a scanning electron microscopy image of the phosphor obtained by heat-treating the zinc silicate powder of Example at 1100° C. in an air atmosphere, and then performing heat treatment again at 900° C. for 2 hours in the reducing (5% of $H_2$ and 95% of $N_2$) atmosphere.

Figure 10:
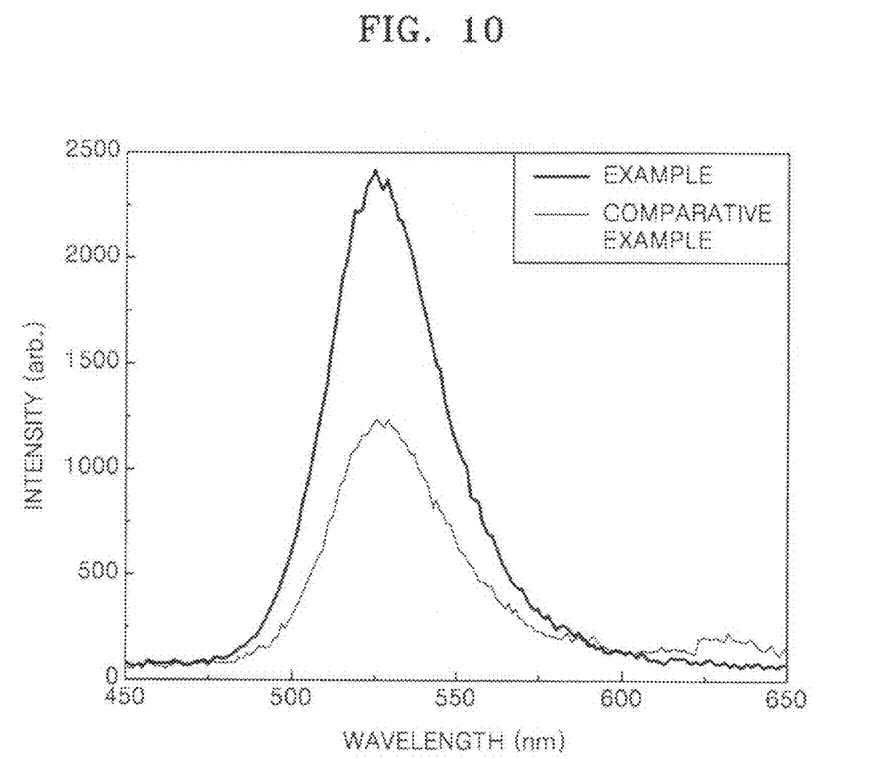
FIG. 10 is a photoluminescence (PL) graph of zinc silicate powder synthesized using a method according to another embodiment of the present invention.

FIG. 10 is a photoluminescence (PL) graph of the zinc silicate powders of Example and Comparative Example. The light emission intensity of the zinc silicate powders of Example is much higher than the light emission intensity of the zinc silicate powders of Comparative Example.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a zinc silicate-based phosphor, the method comprising:
    preparing a solution comprising a Zn precursor compound and a Si precursor compound, a solvent of the solution comprising one selected from the group consisting of ethanol, methanol, 1-propanol, 2-propanol, 1-butanol, 2-butanol, 1-pentanol, 2-pentanol, 3-pentanol, 1-hexanol, and 1-heptanol;
    adding a coprecipitant to the solution to form precipitation, coprecipitant including hydrazine;
    heat-treating the solution in an environment having an ambient temperature of 100° C. to 300° C. in which the precipitation is formed to synthesize zinc silicate ($Zn_2SiO_4$), wherein the coprecipitant further comprises at least one selected from the group consisting of potassium hydroxide, calcium hydroxide, and ammonium hydroxide; and
    heat-treating the synthesized zinc silicate in an environment having an ambient temperature of 600° C. to 1100° C., the synthesized zinc silicate ($Zn_2SiO_4$) having a spherical shape.

2. The method of claim 1, wherein the step of heat-treating the synthesized zinc silicate is performed in an air, nitrogen, or hydrogen atmosphere, or in a nitrogen atmosphere mixed with 10% or less of hydrogen.

3. The method of claim 2, further comprising performing a heat treatment of the synthesized zinc silicate in an environment having an ambient temperature of 600° C. to 1100° C. in an air atmosphere before the steps of heat-treating the synthesized zinc silicate.

4. The method of claim 1, wherein a molar ratio of Zn to Si in the solution comprising the Zn precursor compound and the Si precursor compound is in a range of 1.5:1 to 2.5:1.

5. The method of claim 1, wherein the volume of the coprecipitant is 0.1 to 20 times the volume of the solution comprising the Zn precursor compound and the Si precursor compound.

6. The method of claim 1, wherein the solution comprising the Zn precursor compound and the Si precursor compound further comprises an Mn precursor compound, wherein a molar ratio of Mn to Zn is in a range of 0.01:1 to 0.2:1, and a molar ratio of the combined total of Mn and Zn to Si is in a range of 1.5:1 to 2.5:1.

7. The method of claim 6, wherein the Mn precursor compound includes an oxide, hydroxide or nitrate of Mn.

8. The method of claim 1, wherein the Zn precursor compound includes an oxide, hydroxide or nitrate of Zn, and the Si precursor compound includes an oxide or hydroxide of Si, TEOS (Tetraethyl orthosilicate/$Si(OC_2H_5)_4$), TMOS (Tetramethyl orthosilicate/$Si(OCH_3)_4$) or sodium metasilicate ($Na_2SiO_3$).

9. The method of claim 1, wherein the step of heat-treating the solution is performed under autogenous pressure or at a pressure of 300 MPa or less.

10. A zinc silicate-based phosphor prepared by the method of preparing the zinc silicate-based phosphor according to claim 1.

* * * * *